(12) United States Patent
Ichikawa

(10) Patent No.: US 7,332,876 B2
(45) Date of Patent: Feb. 19, 2008

(54) LIGHTING APPARATUS FOR DISCHARGE LAMP

(75) Inventor: Tomoyuki Ichikawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 177 days.

(21) Appl. No.: 11/196,411

(22) Filed: Aug. 4, 2005

(65) Prior Publication Data

US 2006/0028152 A1 Feb. 9, 2006

(30) Foreign Application Priority Data

Aug. 4, 2004 (JP) ............... P. 2004-227908

(51) Int. Cl.
*H05B 37/02* (2006.01)
(52) U.S. Cl. ............ 315/291; 315/209 R; 315/307; 315/DIG. 7; 315/224
(58) Field of Classification Search ......... 315/291, 315/307, 308, 224, 225, 209 R, DIG. 5, DIG. 7
See application file for complete search history.

(56) References Cited

U.S. PATENT DOCUMENTS

| | | | | |
|---|---|---|---|---|
| 6,208,088 B1 * | 3/2001 | Konishi et al. | ............ | 315/291 |
| 6,583,587 B2 * | 6/2003 | Ito et al. | ............ | 315/308 |
| 6,989,638 B2 * | 1/2006 | Namba et al. | ............ | 315/291 |
| 7,002,305 B2 * | 2/2006 | Kambara et al. | ............ | 315/291 |
| 2002/0117973 A1 | 8/2002 | Ito et al. | ............ | 315/219 |
| 2005/0029964 A1 | 2/2005 | Ishibashi et al. | ............ | 315/291 |

FOREIGN PATENT DOCUMENTS

| | | |
|---|---|---|
| JP | 7-8997 U | 2/1995 |
| JP | 9-237691 A | 9/1997 |
| JP | 9-330795 A | 12/1997 |

* cited by examiner

*Primary Examiner*—Douglas W. Owens
*Assistant Examiner*—Ephrem Alemu
(74) *Attorney, Agent, or Firm*—Sughrue Mion Pllc.

(57) ABSTRACT

In a discharge lamp lighting apparatus, in a transient period from the time a discharge lamp is lit in a cold state to the time the discharge lamp reaches a static lighting state, the power applied to the discharge lamp is reduced over time after an initial maximum power that exceeds the rated power. A maximum power regulator circuit is provided to regulate the applied power in the transient period such that the applied power does not exceed an upper limit power line M1 or M2 that is reduced over time after the application of the initial maximum power. In this way, the application of excessive transient power is prevented from continuing longer than necessary in the event of a failure in a load, thus limiting the amount of generated heat and preventing thermal destruction.

12 Claims, 5 Drawing Sheets

LIGHTING APPARATUS FOR DISCHARGE LAMP

This application claims foreign priority based on Japanese application no. JP2004-227908, filed on Aug. 4, 2004, the contents of which is incorporated herein in its entirety. This priority claim is being made concurrently with the filing of this application.

BACKGROUND

1. Technical Field

The present invention relates to techniques for preventing a discharge lamp from being continuously applied with excessive power more than necessary due to failure in a load when the discharge lamp is turned on from a cold state.

2. Background Art

When a discharge lamp is used for car illumination, light flux must be rapidly increased after the discharge lamp is turned on, so that a transient power control is conducted to supply larger power immediately after the discharge lamp is lit than the power applied for a normal lighting situation, and further, to reduce the applied power over time.

For example, for a metal halide lamp with rated power of 35 W, when lighting is started from a state in which its light emitting tube is cold (so-called "cold start"), the power is controlled such that approximately 60 to 80 W of power is transiently applied to the lamp. Then, the applied power is gradually reduced based on a control value calculated in accordance with the state of the lamp (mainly, a lamp voltage) and an elapsed time from the power-on time to eventually converge the power to the rated value.

Power loss of a lighting circuit increases as larger power is outputted. When large power is applied to a lamp, as with the cold start, a large loss occurs, which increases the amount of generated heat.

In a related art lamp lighting process, even if increased power is temporarily applied in a transient period, the transient period lasts for several seconds, so that the lighting circuit has sufficiently durable specifications with respect to heat-resisting designs of the lighting circuit. Even so, measures should be taken for a possible failure in a load.

For example, in the event of a leak or submergence of a bulb, troubles caused by manufacturing-related faults and aging deterioration (an excessively small amount of mercury, a reduction in inner pressure of an arc tube, and the like), a failure in a lamp, and the like, or when an accident brings about an equivalence to a parallel circuit of a lamp and a low resistor in a lamp connector, a lamp voltage detected by a detector circuit included in a lighting circuit indefinitely remains low, possibly resulting in continuous application of excessive power to the lamp.

In the related art (for example, see Laid-open Japanese Utility Model Registration Application No. 7-8997), a discharge lamp is monitored for power supplied thereto, such that the power supply to the discharge lamp is shut off when the discharge lamp is supplied with power that exceeds the power that should be supplied after the discharge lamp has been lit. Alternatively, when there is a function of determining whether a lamp voltage falls within a normal range in a static light condition determined from information on a detected lamp voltage, the lamp voltage equal to or lower than a predefined reference value is regarded as a failure in lighting, and the power supplied to the discharge lamp can be shut off to protect the circuit.

However, the related art techniques have problems of insufficient measures for protecting circuits from heat generated by a failed load, an increased cost therefor, and the like.

For example, when a high-frequency switching scheme is employed to reduce the size of a lighting apparatus having a fly-back type DC-DC converter circuit, continued application of excessive power, in the event of a failure, can directly lead to thermal runaway, thermal destruction, and the like, due to a reduced thermal capacitance of the overall apparatus.

SUMMARY

It is therefore an object of the invention to take measures to circuit protection by reducing maximum applied power (allowable upper limit value) over time in a discharge lamp lighting apparatus for preventing continued application of excessive transient power to the lighting apparatus in the event of a failure in a load. However, exemplary embodiments of the present invention are not required to achieve this object or any other objects, and may also achieve objects other than this object.

The invention provides a lighting apparatus for a discharge lamp which is configured to reduce power applied to the discharge lamp over time after it is applied with initial maximum power exceeding the rated power in a transient period from the time the discharge lamp is lit from a cold state to the time the discharge lamp reaches a static lighting state. The lighting apparatus includes a maximum power regulator circuit for regulating the applied power in the transient period such that the applied power does not exceed an upper limit power line which is reduced over time after the application of the initial maximum power.

Additionally, the invention provides an apparatus for preventing initial maximum from exceeding a maximum value during a transient period when a discharge lamp is started from a cold start until a stable operation period. The apparatus includes a power conversion circuit that converts a received input into a desired output, a control circuit that generates a power control signal in response to a voltage level signal and a current level signal measured at the desired output, the control circuit comprising a power processing unit that generates at least one first output current based on at least one of the voltage level signal, the current level signal and a first reference voltage, and a maximum power regulator circuit that generates a second output current based on a timing signal and one of a second reference voltage and a power supply signal. The apparatus also includes a starting circuit coupled between the power conversion circuit and the lamp, that outputs power to the lamp during the transient period.

Thus, in the transient power control, the invention can prevent the application of excessive transient power from continuing for a time more than necessary in the event of a failure in a load, thus limiting the amount of generated heat and preventing thermal destruction and the like.

The invention can take sufficient circuit protection measures by preventing thermal detrimental effects resulting from the continuous application of transient power to the discharge lamp.

The lighting apparatus may further comprise a DC-DC converter circuit for converting a received DC input voltage to a desired DC voltage, and a control circuit for controlling the power applied to the discharge lamp. The control circuit may include an error processing unit, and a control signal generator responsive to a signal from the error processing unit for generating a control signal which is sent to the DC-DC converter circuit. The error processing unit receives a reference signal at one input, and an output signal of the maximum power regulator circuit multiplexed on a power control signal, which is calculated based on information on a detected voltage or current associated with the discharge lamp, at the other input. With the foregoing configuration, the lighting apparatus of the invention can reduce the allowable upper limit value for the power applied to the discharge lamp over time without involving a complicated control scheme, a significant increase in cost, and the like.

For example, when the power value regulated by the upper limit power line is reduced over time in accordance with an exponential function or a linear function, the circuit configuration will be effectively simplified.

DETAILED DESCRIPTION

Figure 1:
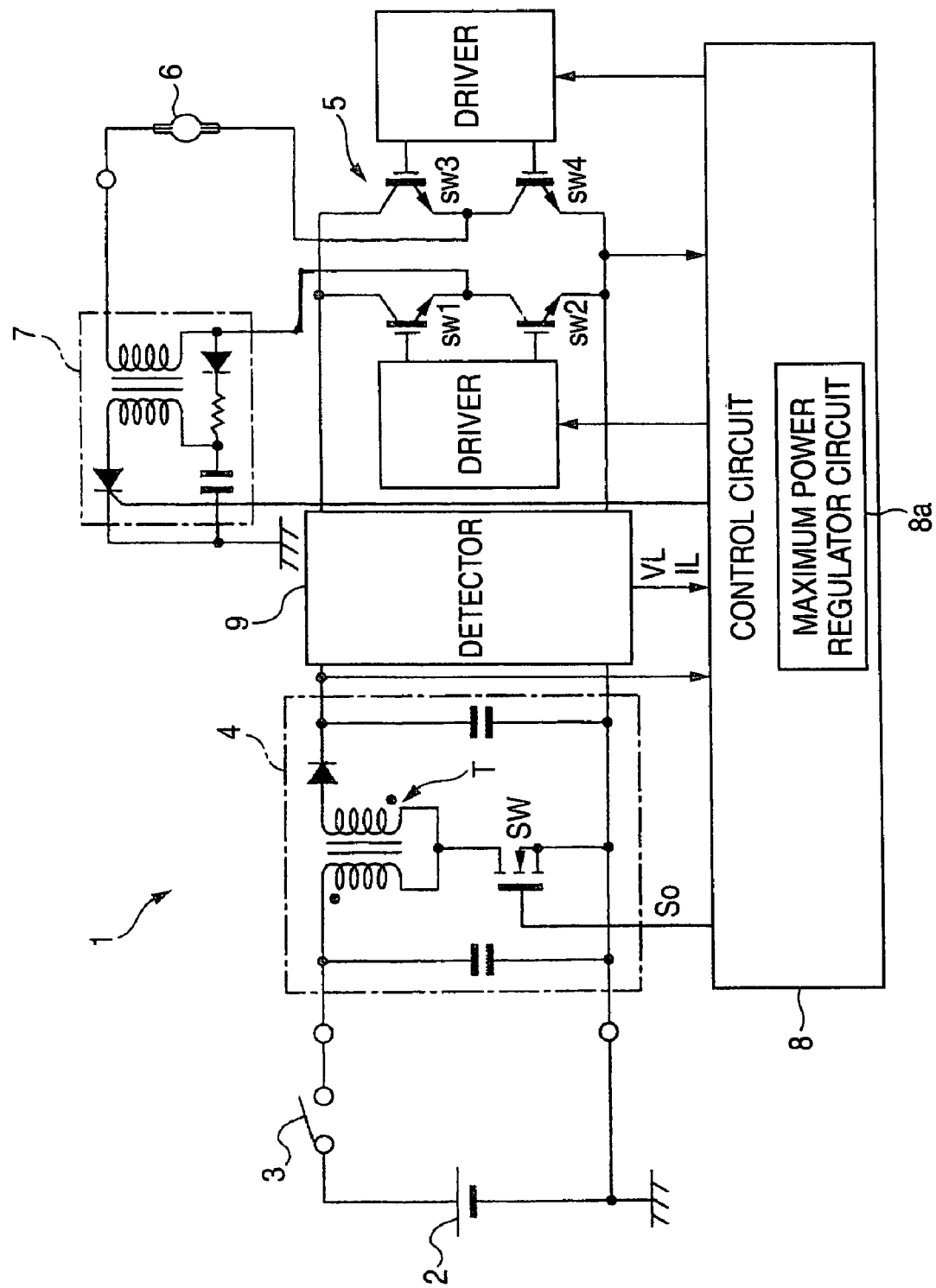
FIG. 1 illustrates an exemplary, non-limiting basic configuration.

FIG. 1 illustrates an exemplary, non-limiting basic configuration of a discharge lamp lighting apparatus 1.

DC voltage from a DC power supply 2 is supplied to a DC-DC converter circuit 4 through a noise filter circuit, not shown, by turning on a lighting switch 3.

The DC-DC converter circuit 4 receives a DC input voltage from the DC power supply 2, and converts the received DC input voltage to a desired DC voltage. For example but not by way of limitation, a fly-back type DC-DC converter can be used for the DC-DC converter circuit 4. In a circuit configuration having a transformer T and a switching element SW on the primary side of the transformer T, the switching element SW is driven by a control signal So from a control circuit 8, later described.

A DC-AC converter circuit 5 is provided for converting an output voltage of the DC-DC converter circuit 4 to an AC voltage that is supplied to a discharge lamp 6. For example but not by way of limitation, in a circuit configuration of H-bridge (or full bridge), four semiconductor switches sw1-sw4 are used to make two arms, and driving circuits are included for driving the switching elements on the respective arms independently of each other. The AC voltage is outputted by complementarily controlling on/off the two pairs of switching elements.

A starting circuit 7 is provided for generating a high voltage pulse signal (starting pulse) to start the discharge lamp 6. This signal is multiplexed on the AC voltage outputted from the DC-AC converter circuit 5, and the resulting multiplexed signal is applied to the discharge lamp 6. In this example, the starting circuit 7 is implemented by a trigger transformer, a cylister, a capacitor, or the like.

The control circuit 8 has a power control unit for controlling the power supplied to the discharge lamp 6. For example but not by way of limitation, in a transient period from lighting of the discharge lamp 6 started in a cold state to the static lighting state, the power control unit controls the power such that the power applied to the discharge lamp 6 is reduced over time after application of initial maximum power exceeding the rated power. As a result, the discharge lamp 6 transitions to a static lighting state.

A detector unit 9 is disposed after the DC-DC converter circuit 4 for acquiring detected signals of a lamp voltage and a lamp current or a voltage and a current corresponding thereto. As the detector unit 9 sends a lamp state detection signal (see a voltage detection signal "VL" and a current detection signal "IL") to the control circuit 8, the control circuit 8 sends a control signal (labeled "So") to the DC-DC converter circuit 4 to control an output voltage of the DC-DC converter circuit 4. More specifically, the generated control signal So is sent to the switching element SW of the DC-DC converter circuit 4 for driving control. Switching control schemes used in this embodiment include, for example, a PWM (pulse width modulation) scheme, and PFM (pulse frequency modulation) scheme, but are not limited therero.

The control circuit 8 is provided with a maximum power regulator circuit 8a for regulating the power applied to the discharge lamp 6 in a transient period until the discharge lamp 6 reaches the stable static lighting state so as not to exceed an upper limit power line, which is reduced over time after the initial maximum power has been applied. Thus, the maximum power regulator circuit 8a regulates the maximum power value (allowed upper limit value) in accordance with the lapse of time, to prevent the continued application of excessive power to the discharge lamp 6 longer than necessary when a load fails.

Figure 2:
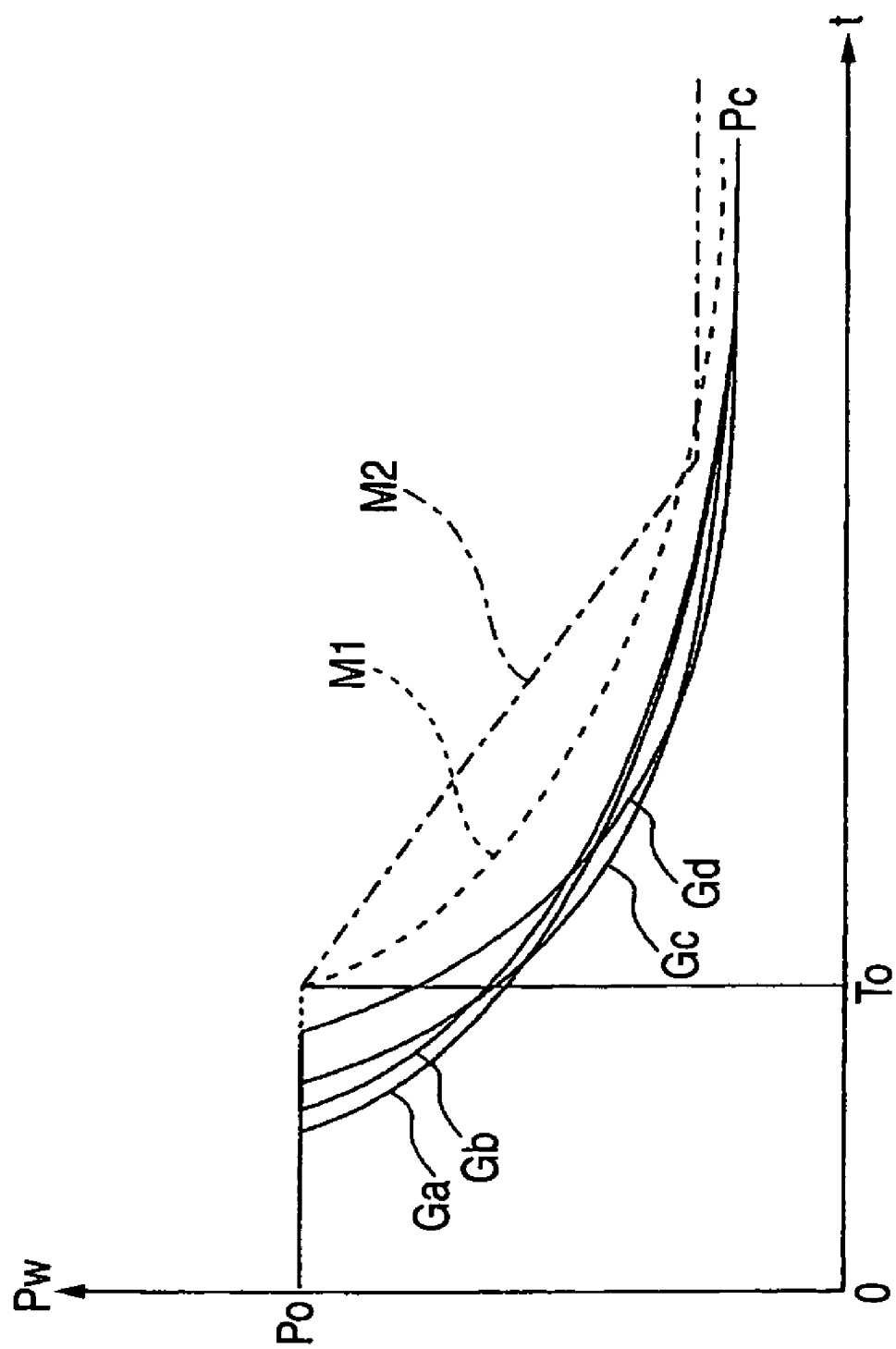
FIG. 2 illlustrates a change in transient power applied to a lamp over time.

FIG. 2 illustrates a change in the applied power Pw over time from power-on at a cold start, where the horizontal axis represents the time "t" and the vertical axis represents the applied power "Pw." "Po" on the vertical axis indicates the initial maximum power supplied to the discharge lamp for a period "$0 \leq t \leq To$". While To is assumed to be a fixed value, To can be made longer if a longer unlit time is present before the discharge lamp is lit. "Pc" indicates the rated power.

Curves Ga, Gb, Gc, Gd in the graph represent a difference in changes in the applied power over time due to the differences among respective discharge lamps. Variations are recognized in the change in the applied power from a difference in a lamp state and the like related to individual discharge lamps.

However, the maximum allowable value (or an upper limit value), which decreases in accordance with an elapsed time, can be defined with respect to the change in the power applied to each discharge lamp. Curves M1, M2 in the graph indicate upper limit power lines (or allowable maximum power lines), which should not be exceeded by the varying power in a lighting state of the discharge lamp.

The curve M1 represented by a dotted line shows an upper limit power line, which exponentially decreases as the time elapses after To. The curve M2 represented by a one-dot chain line shows an upper limit power line, which levels off after it linearly decreases as the time elapses after To.

Such an upper limit power line can be defined by statistically examining changes in the power applied to discharge lamps. The transient power applied to the lamp is regulated by the maximum power regulator circuit 8a so as not to exceed the upper limit power line (e.g., M1 or M2).

In the transient power control at a cold start, complete measures can be taken for heat generation by reducing the allowable upper limit value for the applied power over time, and by regulating the transient power applied to the lamp so as not to exceed the allowable upper limit value indicated by the upper limit power line, even if a discharge lamp is connected to the lighting circuit.

Figure 3:
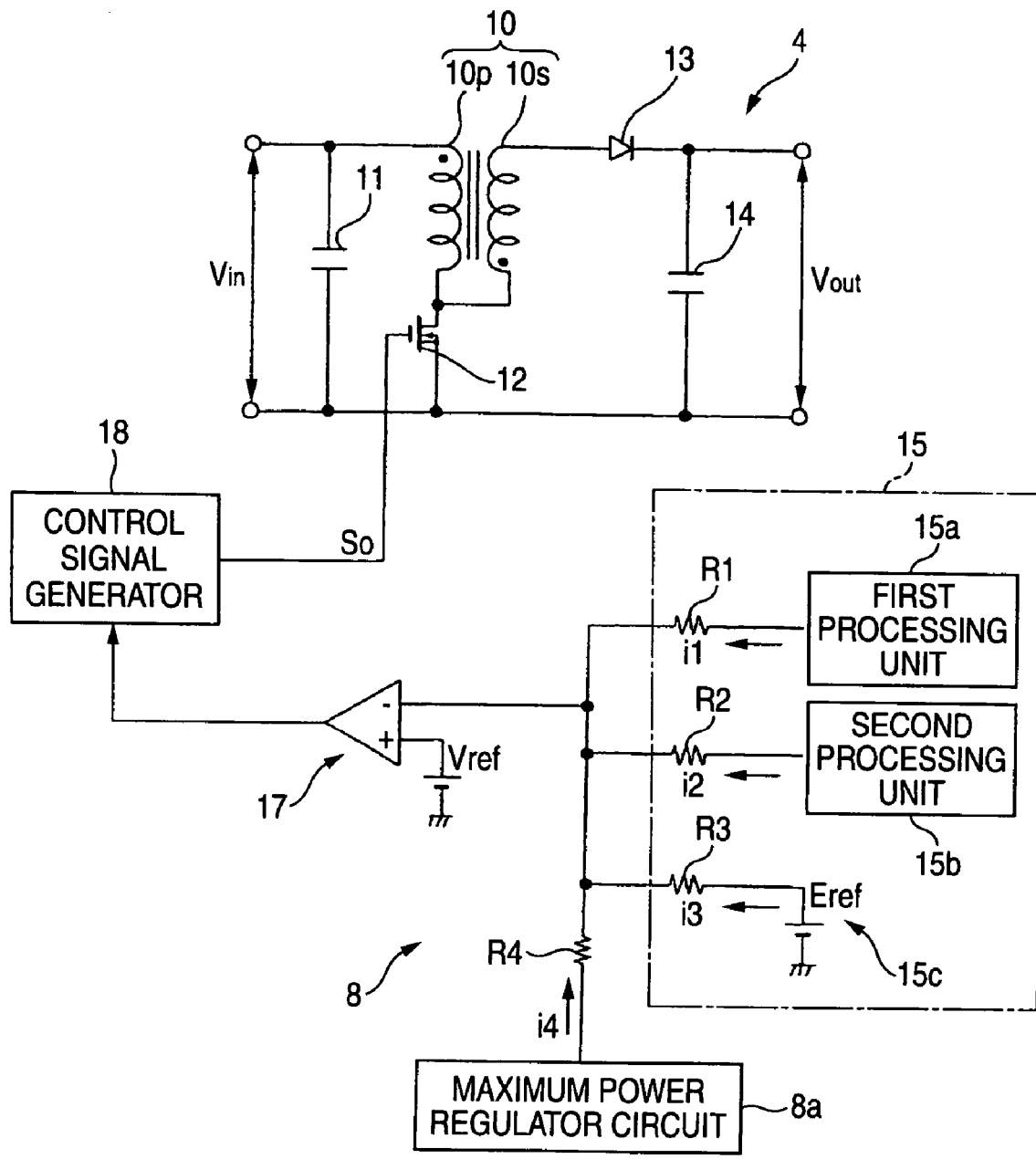
FIG. 3 illustrates an exemplary, non-limiting circuit configuration of a main portion.

FIG. 3 is a diagram for describing an exemplary configuration of main circuits including the DC-DC converter circuit 4 and control circuit 8. "Vin" shown in FIG. 3 indicates a DC input voltage to the DC-DC converter circuit 4, and "Vout" indicates a DC output voltage of the DC-DC converter circuit 4.

A capacitor 11 is disposed on the primary side of a transformer 10. A leading end of a primary winding 10p is coupled to an end of the capacitor 11, while a trailing end of the primary winding 10p is connected to a switching element 12 (N-channel FET in this example).

A rectifying diode 13 and a smoothing capacitor 14 are disposed on the secondary side of the transformer 10. The leading end of a secondary winding 10s is coupled to a connection point of the primary winding 10p with the switching element 12, and the trailing end of the secondary winding 10s is connected to an anode of the diode 13. One end of the capacitor 14 is connected to a cathode of the diode 13, and its terminal voltage is outputted to a subsequent circuit (DC-AC converter circuit) as Vout.

In this exemplary, non-limiting embodiment, the control circuit 8 comprises a power processing unit 15, an error processing unit 17, and a control signal generator unit 18. The power processing unit 15 comprises a first processor 15a, a second processor 15b, and an offsetting circuit 15c.

The first processor 15a generates an output current (labeled "i1") in accordance with the voltage detection signal VL acquired, for example but not by way of limitation, from the output of the DC-DC converter circuit 4, and comprises a function generator circuit that receives VL (the type of function may be arbitrary). The output of the first processor 15a is sent to the error processing unit 17 through a resistor R1.

The second processor 15b generates an output current (labeled "i2") in accordance with the current detection signal IL acquired, for example but not by way of limitation, by a lamp current detecting resistor disposed subsequent to the DC-DC converter circuit 4, and comprises a function generator circuit which receives IL (the type of function may be arbitrary). The output of the second processor 15b is sent to the error processing unit 17 through a resistor R2.

As represented by the symbol of a regulated voltage source in FIG. 3, the offsetting circuit 15c sends a reference voltage "Eref" to the error processing unit 17 through a resistor R3 (see an output current "i3").

The maximum power regulator circuit 8a sends its output to the error processing unit 17 through a resistor R4 (see an output current "i4") in order to prevent detrimental effects caused by an increased power loss and generated heat when excessive transient power is continuously applied by the output of the power processing unit 15. However, the maximum power regulator circuit 8a does not affect the relationship with the output of the power processing unit 15 in normal power control.

Accordingly, the error processing unit 17 is supplied, at one input thereof, with an output signal (i4) of the maximum power regulator circuit 8a multiplexed on the power control signals (i1-i3) that are calculated based on information on the detected voltage or current associated with the discharge lamp. Specifically, the first processing unit 15a, second processing unit 15b, offsetting circuit 15c, and maximum power regulator circuit 8a are arranged in parallel, and weighted additions are performed in accordance with weighting coefficients determined by the respective resistances of the resistors R1-R4, to send control signals of the respective components (the sum total of respective output currents) to the error processing unit 17.

In this exemplary, non-limiting embodiment, the control signal is input to a negative input terminal of an error amplifier that forms part of the error processing unit 17, and a positive input terminal of the error amplifier is supplied with the reference voltage "Vref" indicated by the symbol of a regulated voltage source (control is conducted to reduce the power supplied to the discharge lamp as the control signal has a higher level).

An output signal of the error processing unit 17 is sent to the control signal generator 18, which generates the aforementioned control signal So. For example but not by way of limitation, in the PWM scheme, the control signal generator 18 includes a PWM comparator and the like, and an error signal from the error processing unit 17 is supplied to the comparator. The comparator is also supplied with a ramp wave at a frequency, and generates an output signal at a duty ratio that varies in accordance with the result of a comparison between the levels of the inputs. The output signal is supplied to the switching element 12.

In the PFM scheme, the error processing unit 17 generates an output signal, the frequency of which varies in accordance with an error signal from the error processing unit 17, and supplies this output signal to the switching element 12.

Figure 4:
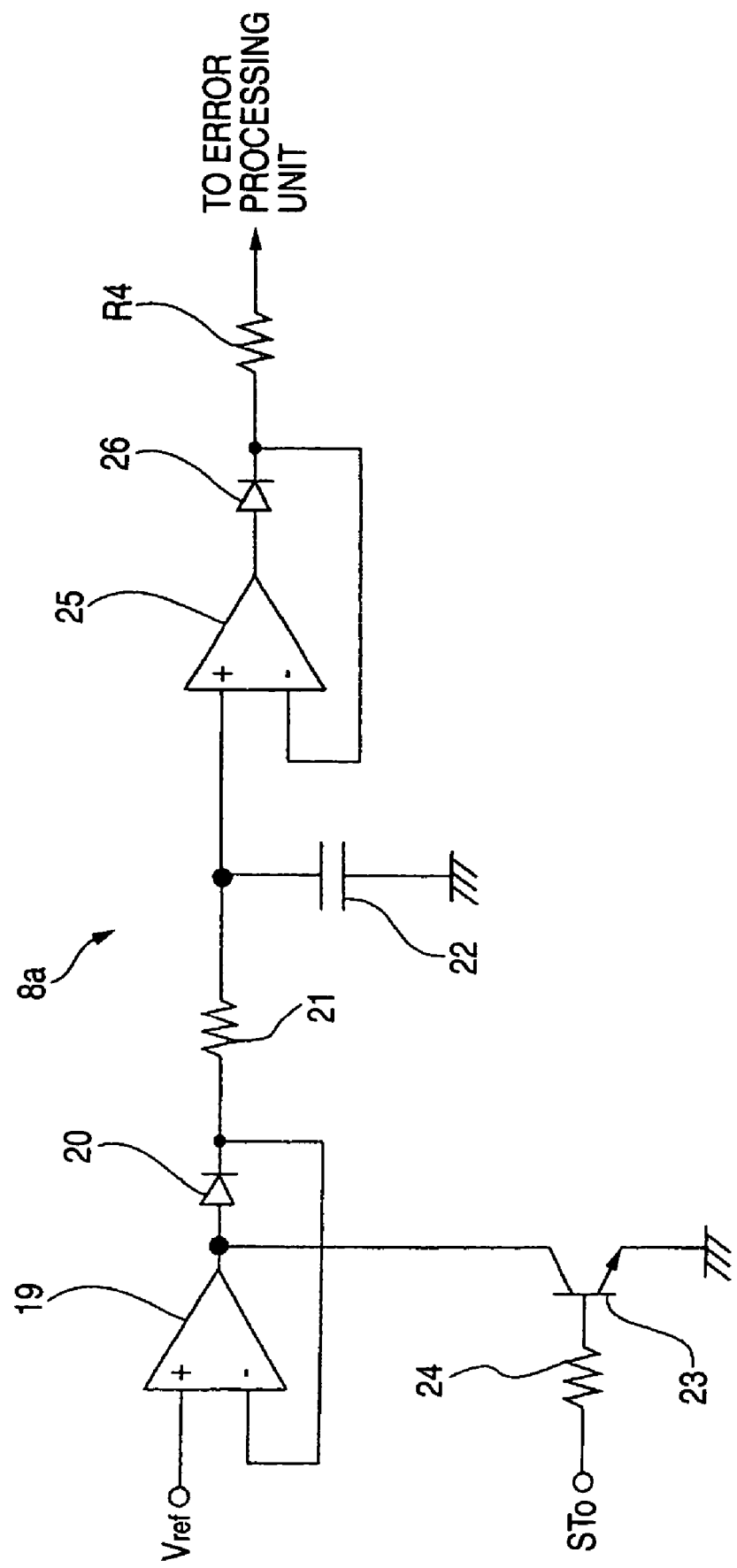
FIG. 4 illustrates an exemplary, non-limiting configuration of a maximum power regulator circuit.

FIG. 4 illustrates an exemplary, non-limiting configuration of the maximum power regulator circuit 8a. An operational amplifier 19 is supplied with the reference voltage "Vref" at its non-inverting input terminal. The operational amplifier 19 has an output terminal connected to an anode of a diode 20.

The diode 20 has a cathode coupled to an inverting input terminal of the operational amplifier 19 and also coupled to a capacitor 22 through a resistor 21.

An emitter-grounded NPN transistor 23 is supplied at its base with a signal (hereinafter labeled "STo") from a circuit (timer circuit or the like), not shown, through a resistor 24. The transistor 23 has a collector coupled to the output terminal of the operational amplifier 19. Until a time (the aforementioned "To") elapses after the power is turned on, the signal STo is set to H (high) level, causing the transistor 23 to transit to the on position to forcedly bring the output signal of the operational amplifier 19 to L (low) level.

After the lapse of the time To, as the signal STo changes to L level to cause the transistor 23 to transit off, a charging operation is started on the capacitor 22 through the resistor 21.

A subsequent operational amplifier 25 has a non-inverting input terminal coupled to one end of the capacitor 22. The operational amplifier 25 has an output terminal coupled to an anode of a diode 26, which has a cathode connected to an inverting input terminal of the operational amplifier 25, and to the resistor R4.

In the foregoing configuration, the transistor 23 remains on while the signal STo is at H level, so that the capacitor 22 is prohibited from being charged. However, as the signal STo goes to L level after the lapse of the time To, the transistor 23 transits to the off position to charge the capacitor 22. In other words, the voltage on the capacitor 22 exponentially increases over time (since the upper limit power line is in an opposite-phase relationship with the change, the upper limit power line exponentially decreases over time).

A time constant circuit including the resistor 21 and capacitor 22 (CR integrator circuit) may be used to reduce the circuit scale.

Figure 5:
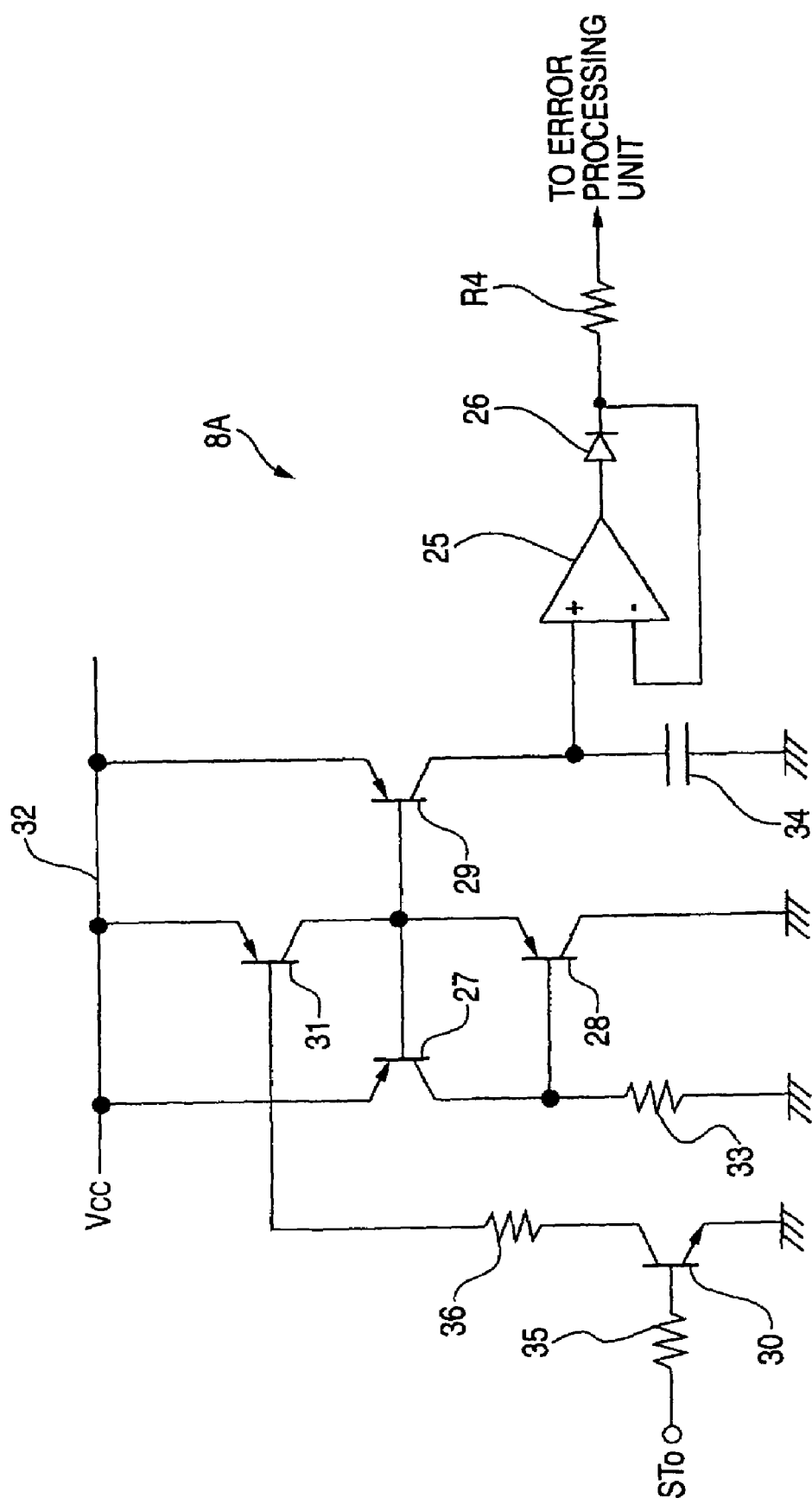
FIG. 5 illustrates another exemplary, non-limiting configuration of a maximum power regulator circuit.

FIG. 5 shows an exemplary, non-limiting configuration of the maximum power regulator circuit 8A. In this exemplary, non-limiting embodiment, the operational amplifier 25 is coupled to a circuit using PNP transistors 27, 28, 29 and transistors 30, 31 which make up a current mirror circuit.

The PNP transistor 27 has its emitter connected to a power supply line 32 at a voltage (Vcc), and its collector grounded through a resistor 33.

The collector-grounded PNP transistor 28 has its base connected to the collector of the transistor 27, and its emitter connected to bases of the transistors 27, 29.

The PNP transistor 29 has its base connected to the base of the transistor 27, and its emitter connected to the power supply line 32. Then, the transistor 29 has its collector grounded through a capacitor 34.

The emitter-grounded NPN transistor 30 is supplied with the signal STo at its base through a resistor 35, and the transistor 30 has a collector connected to a base of the transistor 31 through a resistor 36.

The PNP transistor 31 has its emitter connected to the power supply line 32, and its collector connected to the bases of the transistors 27, 29.

The operational amplifier 25 has its non-inverting input terminal connected (or coupled, as in the present application, "connected" and "coupled" are used interchangeably to refer to either the direct or indirect electrical connection of elements) to a capacitor 34 and to the collector of the transistor 29. Then, the operational amplifier 25 has an output terminal connected to the anode of the diode 26 which has the cathode connected to an inverting input terminal of the operational amplifier 25 and to the resistor R4.

In the foregoing configuration, the transistors 30, 31 remain on while the signal STo is at H level, so that the capacitor 34 is prohibited from being charged. However, as the signal STo goes to L level after the lapse of the time To, the transistors 30, 31 turn off, thus charging the capacitor 34 with a corrector current of the transistor 29. In other words, a charging operation is performed with a constant current, so that the voltage on the capacitor 34 linearly increases over time (since the upper limit power line is in an opposite-phase relationship with the change, the upper limit power line linearly decreases over time).

According to the configuration described above, the upper limit power line is set at a level slightly higher than a time varying maximum power value in the transient power control in consideration of variations in change over time of the applied power due to differences among individual discharge lamps, thus avoiding a power supply exceeding the upper limit power line for any load condition. In this way, sufficient measures can be taken to heating of the lighting apparatus to support a reduction in size of the lighting apparatus.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

The invention claimed is:

1. An apparatus for lighting a discharge lamp so as to reduce power applied to the discharge lamp after an application of an initial maximum power exceeding the rated power in a transient period when the discharge lamp is lit from a cold state to a static lighting state, said apparatus comprising:

a maximum power regulator circuit that regulates the applied power in the transient period such that the applied power does not exceed an upper limit power line that is gradually reduced after the application of the initial maximum power; and an error processing unit, wherein an output signal of the maximum power regulator circuit multiplexed on a power control signal calculated based on at least one of a detected voltage and a current associated with the discharge lamp is supplied to the error processing unit.

2. The apparatus according to claim 1, further comprising:

a DC-DC converter circuit that converts a received DC input voltage to a desired DC voltage; and a control circuit that controls the power applied to the discharge lamp, wherein said control circuit includes the error processing unit that provides a signal to a control signal generator that generates and outputs a control signal to the DC-DC converter circuit, wherein the error processing unit receives a reference signal at one input, and at another input, the output signal of the maximum power regulator circuit.

3. The apparatus according to claim 2, wherein when a power value regulated by the upper limit power line is reduced over time in accordance with one of an exponential function and a linear function.

4. An apparatus for preventing initial maximum from exceeding a maximum value during a transient period when a discharge lamp is started from a cold state until a stable operation period, comprising:

a power conversion circuit that converts a received input into a desired output;

a control circuit that generates a power control signal in response to a voltage level signal and a current level signal measured at said desired output so as to not exceed said maximum value, comprising, a power processing unit that generates at least one first output current based on at least one of said voltage level signal, said current level signal and a first reference voltage, and a maximum power regulator circuit that generates a second output current based on a timing signal and one of a second reference voltage and a power supply signal; and a starting circuit coupled between said power conversion circuit and said lamp, that outputs power to said lamp during said transient period.

5. The apparatus of claim 4, wherein said at least one first output current and said second output current are multiplexed to form a multiplexed current signal.

6. The apparatus of claim 5, further comprising:

an error processing unit that compares said multiplexed current signal to a reference error voltage, and generates an error processor output in accordance with said comparison; and a control signal generator unit that generates a switching signal based on said error processor output.

7. The apparatus of claim 6, wherein said switching signal is generated according to one of pulse width modulation and pulse frequency modulation.

8. The apparatus of claim 6, said power processing unit comprising:

a first processor that generates a first processor output current based on said voltage level signal;

a second processor that generates a second processor output current based on said current level signal; and an offsetting circuit that generates a reference current based on said first reference voltage, wherein at least one of said first processor output current, said second processor output current and said reference current comprise said at least one first current output.

9. The apparatus of claim 8, wherein said first processor output current, said second processor output current and said reference current are weighted with respect to one another.

10. The apparatus of claim 4, wherein said maximum power regulator circuit comprises:
   a capacitor that is charged in accordance with a timing signal and one of said power supply signal and said reference voltage;
   an operational amplifier having its non-inverting terminal coupled to said capacitor; and
   a diode that receives an output of an operational amplifier to generate said second output current, wherein a first terminal of said diode is coupled to an output of said amplifier and a second terminal of said diode is coupled to an inverted terminal of said operational amplifier, and wherein said timing signal has a first value said capacitor is not charged, and when said timing signal has a second value said capacitor is charged.

11. The apparatus of claim 10, wherein said capacitor is coupled to a current mirror when said power supply signal determines a charging of said capacitor, and said capacitor is coupled to a resistor when said reference voltage determines said charging of said capacitor.

12. An apparatus for preventing initial maximum from exceeding a maximum value during a transient period when a discharge lamp is started from a cold state until a stable operation period, comprising:
   means for converting a received input into a desired output;
   means for generating a power control signal in response to a voltage level signal and a current level signal measured at said desired output so as to not exceed said maximum value, comprising,
   means for generating at least one first output current based on at least one of said voltage level signal, said current level signal and a first reference voltage, and
   means for generating a second output current based on a timing signal and one of a second reference voltage and a power supply signal; and
   means, which is coupled between said power conversion circuit and said lamp, for outputting power to said lamp during said transient period.

* * * * *